(12) United States Patent
Christoffersson et al.

(10) Patent No.: US 8,228,831 B2
(45) Date of Patent: Jul. 24, 2012

(54) CHANNEL DEPENDENT GATING

(75) Inventors: Jan Christoffersson, Lulea (SE); Marten Ericson, Lulea (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 347 days.

(21) Appl. No.: 12/674,133

(22) PCT Filed: Aug. 22, 2007

(86) PCT No.: PCT/SE2007/000743
§ 371 (c)(1),
(2), (4) Date: Feb. 18, 2010

(87) PCT Pub. No.: WO2009/025593
PCT Pub. Date: Feb. 26, 2009

(65) Prior Publication Data
US 2011/0044305 A1    Feb. 24, 2011

(51) Int. Cl.
  H04J 1/16 (2006.01)
  H04J 3/00 (2006.01)
  H04W 4/00 (2009.01)
  G08C 17/00 (2006.01)
(52) U.S. Cl. ........ 370/311; 370/229; 370/328; 370/338; 370/345
(58) Field of Classification Search .................... None
See application file for complete search history.

(56) References Cited

U.S. PATENT DOCUMENTS
2007/0030829 A1   2/2007 Vimpari et al.
2007/0286155 A1*  12/2007 Kaikkonen et al. ........... 370/350

FOREIGN PATENT DOCUMENTS
EP      1 045 530 A1    10/2000
WO    WO 01/99313 A1    12/2001

OTHER PUBLICATIONS

International Search Report dated Jul. 8, 2008 (4 pages).
International Preliminary Report on Patentability dated Dec. 29, 2009 (7 pages).
3GPP TSG-RAN WG2#55 R2-062819, "Adaptive DRX and DTX Setting for LTW_ACTIVE", Agenda Item 13.2, Seoul, Korea, Oct. 9-13, 2006, pp. 1-2 (2 total pages).
Oscar Fresan et al., "DPCCH Gating Gain for Voice over IP on HSUPA", IEEE 1525-3511, Mar. 2007, pp. 4277-4281 (5 total pages).

* cited by examiner

*Primary Examiner* — Anh-Vu H Ly
*Assistant Examiner* — Diane Lo
(74) *Attorney, Agent, or Firm* — Myers Bigel Sibley & Sajovec, P.A.

(57) ABSTRACT

Network element (400, 500), method and computer program for communication in a wireless communication network comprising: receiving at least one measured parameter value indicative of the channel quality on a radio channel at the processing unit (420, 520) of the network element (400, 500), calculating a deviation from a nominal parameter value indicative of the expected quality of the radio channel in the processing unit (420, 520), comparing the deviation from the nominal parameter value with at least a lower threshold value indicative of the lower threshold for the deviation from the nominal parameter value and/or an upper threshold value indicative of the upper threshold of deviation from the nominal parameter value and altering the gating scheme for the power control channel in the processing unit (420, 520) and using a control unit (450, 540) in the network element (400, 500) to signal the change of the gating scheme on control channel via the transceiver (410, 510).

16 Claims, 5 Drawing Sheets

CHANNEL DEPENDENT GATING

TECHNICAL FIELD

The present invention is related to the concept of signalling in wireless communication networks. More specifically, the present invention is related to the reduction of transmission overhead in wireless communication networks by means of gating.

BACKGROUND OF THE INVENTION

In modern commercial mobile communication networks, such as, for example WCDMA HSPA (Wideband Carrier Division Multiple Access High-Speed Packet Access)-networks, theoretic bit rates of up to 14 Mbit/s in DL (Downlink) and up to 5.7 Mbps when using the enhanced WCDMA UL (Wideband Carrier Division Multiple Access Uplink, also called EUL) are possible. These high bit rates are achieved by adaptive modulation and coding schemes, fast link adaptation and transmission resource scheduling.

One problem when trying to achieve efficient utilization of the available resources on a radio channel and at the same time providing sufficient user satisfaction (which is related to throughput and delay) is the signaling overhead. Signaling overhead increases the interference in a cell and decreases the actual capacity.

The transmission of data over the air, is performed by using several different physical channels per user equipment (UE). For example, using EUL (UE to base station transmission) the channels DPCCH, E-DPCCH and E-DPDCH are used. UL DPCCH (Uplink Dedicated Physical Control Channel) contains the pilot bits and the power control bits, necessary for making a efficient decoding of the data. The data is transmitted in the E-DPDCH (Enhanced Dedicated Physical Data Channel). When data is transmitted the E DPCCH (Enhanced Dedicated Physical Control Channel) is also necessary, which contains information about the actual packet size and scheduling information etc. In previous standard of the WCDMA, each user using EUL must always transmit the DPCCH, even though no actual data is transmitted. When data is to be transmitted, E-DPDCH and E-DPCCH are used during the transmission period. The power of the E-DPDCH and E-DPCCH are set according to a power offsets compared to the power of the DPCCH.

Since the UL DPCCH is continuously transmitted it causes a major part of the overhead and increases the interference.

Moreover, the DPCCH transmission consumes valuable battery power from the mobile terminal.

One known solution to the control signaling overhead is the principle of "gating", meaning that DPCCH is not sent continuously, but rather in either well defined time periods on a dedicated control channel or when data is sent on the uplink. Gating may be used also with so called preambles, meaning that the next transmission of DPCCH is done prior to transmitting data on a separate physical channel. These preambles may be one or more time slots long (one time slot is 0.667 ms in WCDMA). WCDMA 3GPP Rel-7 (Third Generation Partnership Project Release 7) includes a gating concept for WCDMA EUL (called UE DTX in the standard).

Figure 1:
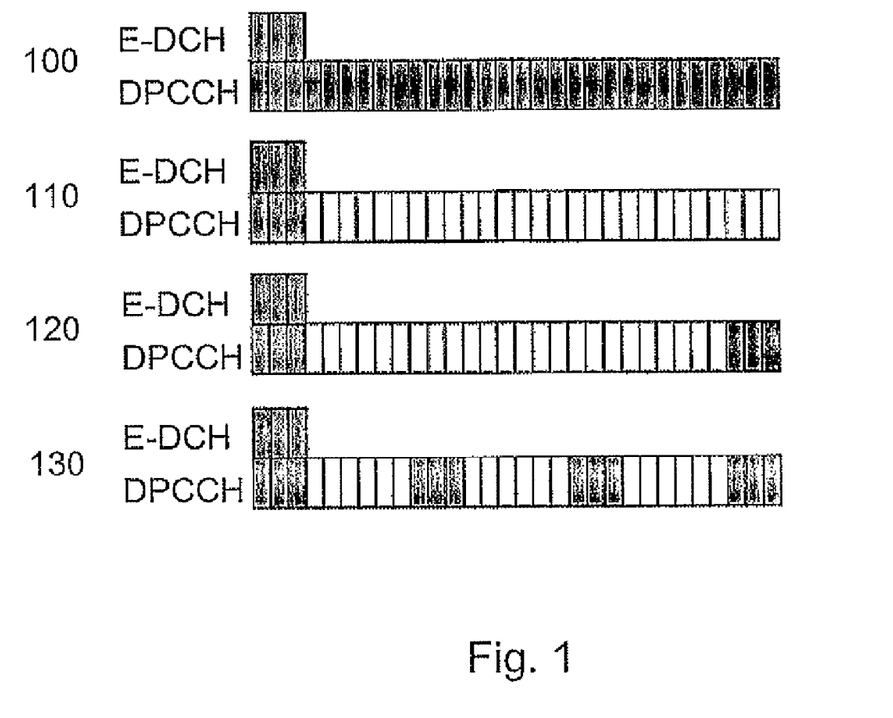
FIG. 1 illustrates different variants of gating according to known technology.

Some different variants of gating with preambles and different gating intervals are shown in FIG. 1. For example, in 130 the interval of the gating update is 6 slots, and the length of gating update burst is 3 slots and the preamble (preceding actual data E-DPDCH transmission) length is also 3 slots (same as 120).

There are several patents in this area, for example US2007/0030828 and US2007/0030829. However, in some situations, even gating will not perform very well and may lead to lower user satisfaction than no gating. The above mention patents do not address this issue. Examples of such situations may be when mobile terminals move at high speed, such as around 25 m/s or faster. Fast fading in this case will lead to rapidly changing channel conditions and render CQI reports inaccurate. Also, simulations in the high-speed case have shown that the relatively slow power control signaling due to gating will in fact degrade system performance compared to no gating.

The present invention aims at addressing at least some of the problems related to known technology.

SUMMARY OF THE INVENTION

One aspect of the present invention is related to a network element for communication in a wireless communication network comprising a transceiver, a processing unit adapted for receiving at least one measured parameter value which indicates the channel quality on a radio channel and for calculating the deviation of the measured parameter value from a nominal parameter value which indicates an expected quality on the radio channel and a control unit adapted for controlling the signal power on a radio control channel, wherein the processing unit is further adapted for comparing the calculated deviation of the measured parameter value with a lower threshold value which indicates the lower threshold of deviation from a nominal parameter value and/or an upper threshold of deviation from a nominal parameter value, where the processing unit is further adapted for instructing the control unit to adjust the power of a data channel or to adjust the signalling scheme of the control channel and to signal the adjustment of the signalling scheme of the control channel if the calculated deviation from a nominal parameter value lies outside of the deviation interval defined by at least the lower threshold value.

In this fashion, the gating of the control signaling will be able to better reflect the changing conditions on the radio channel, especially when a mobile terminal is moving at high speeds.

It may be added that the adjustment of the power of the control channel may comprise adjustment of the power of a data channel relative to the power of the control channel and that the adjustment of the signaling scheme of the control channel may comprise changing the number of power control bits in the control channel or the change of gating scheme of the control channel. This elaboration is also valid for other aspects of the present invention explained more in detail below.

One other aspect of the present invention is related to a method of communication in a wireless communication network comprising the steps:

a) receiving at least one measured parameter value indicating the channel quality on a radio channel;

b) calculating a deviation from a nominal parameter value indicating the expected quality of the radio channel;

c) comparing the deviation from the nominal parameter value with at least a lower threshold value indicating the lower threshold for the deviation from the nominal parameter value and/or an upper threshold value indicating the upper threshold of deviation from the nominal parameter value;

d) adjusting the power of a control channel or adjusting the signalling scheme of the control channel and signalling the adjustment of the signalling scheme of the control channel.

it should be mentioned here, that the method steps above are specially suited for being executed by the mobile terminal according to the present invention.

Yet another aspect of the present invention is related to computer program for communication in a wireless communication network comprising instruction sets for:
a) receiving at least one measured parameter value indicative of the channel quality on a radio channel;
b) calculating a deviation from a nominal parameter value indicative of the expected quality of the radio channel;
c) comparing the deviation from the nominal parameter value with at least a lower threshold value indicative of the lower threshold for the deviation from the nominal parameter value and/or an upper threshold value indicative of the upper threshold of deviation from the nominal parameter value;
d) adjusting the power of a control channel or adjusting the signalling scheme of the control channel and signalling the adjustment of the signalling scheme of the control channel.

Here, it is worth mentioning that the computer program according to the present invention is especially suited for implementing the method steps of the method according to the present invention.

DETAILED DESCRIPTION OF PREFERRED EMBODIMENTS

FIG. 1 illustrates possible gating schemes in systems using known technology. Particularly it shows example gating schemes which may be used in VoIP (Voice-over-IP) in a 3GPP R6 or 3GPP LTE scenario.

Depicted by 100, the first scheme illustrates continuous transmission on the DPCCH (Dedicated Physical Control Channel). Here, each vertical box illustrates one transmission slot, where the black boxes in the DPCCH represent the transmitted TPC and pilot bits. The pilot bits are necessary for channel estimation and decoding of the data. In this case, three transmission slots form one TTI (Transmission Timing Interval). Above the DPCCH there is also shown an E-DCH (Enhanced Dedicated Channel) on which a mobile terminal is sending user data—also indicated by black boxes. E-DCH contains both E-DPCCH and E-DPDCH. The actual data is transmitted in the E-DPDCH (Enhanced Dedicated Physical Data Channel) together with the E-DPCCH, which contains information about the actual packet size and scheduling information etc.

This scheme may in certain cases, e.g. for bursty services such as VoIP and WWW, cause unnecessary overhead and interference and lead to less efficient utilization of the channel capacity. For example, a VoIP packet is typically transmitted only every 20 ms, and therefore transmits only data during 2 ms out the 20 ms cycle. This means that the DPCCH is transmitted unnecessarily when there is no actual data transmission, causing unnecessary overhead.

A first variant of gating is depicted by the reference number 110. Here, we have the case where DPCCH is only transmitted when user data is sent in the E-DCH. The blank boxes indicate no TPC bit transmission. This gating scheme is often more efficient than the one in 100, since it leads to significantly less control signaling.

One other scheme is depicted by 120, where prior to a next user data transmission on the E-DCH, three slots with DPCCH bits are transmitted. This gating scheme is called gating with preamble. Often, this gating scheme is even more efficient compared to the previous two schemes (100 and 110), since it takes the changes in the transmission conditions on the uplink channel into account before the next user data is transmitted, therefore providing more accurate TPC commands.

The last gating scheme, referred to as 130, illustrates a gating scheme with a 3 bit slot preamble and 6 slots gating period.

Figure 2:
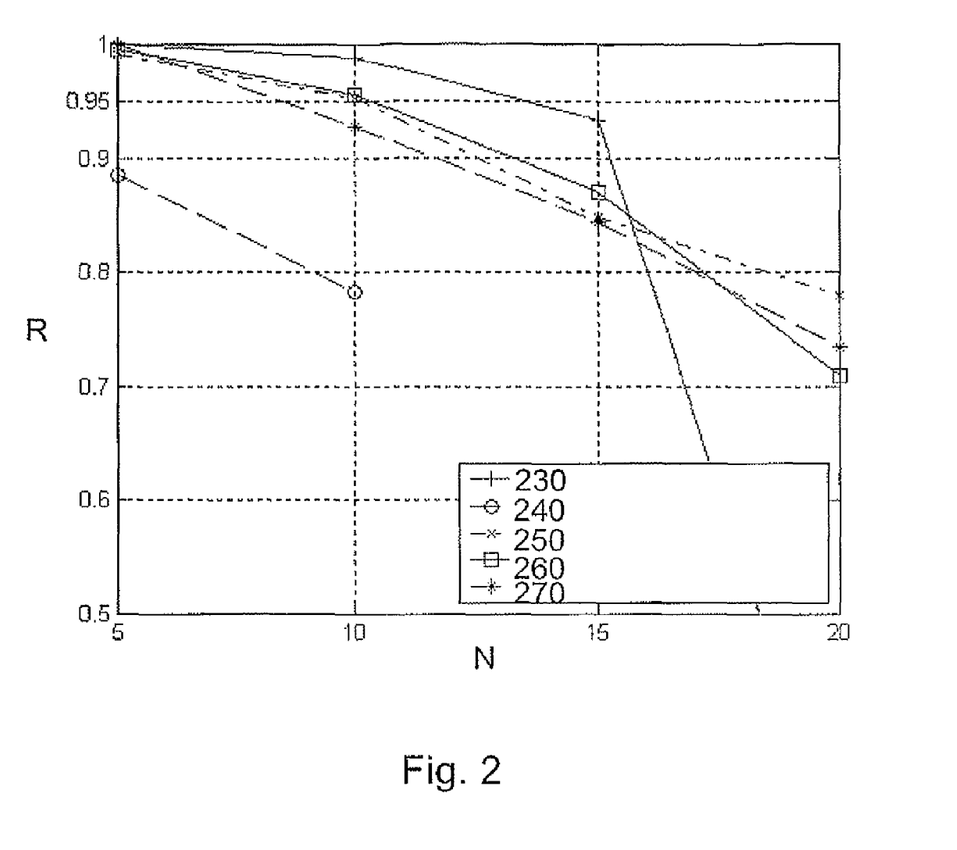
FIG. 2 illustrates the simulated performance of systems using gating schemes and no gating at high mobile terminal speeds.

Turning now to FIG. 2, a simulation of a high-speed mobile terminal in a wireless communication network is illustrated where different power control signaling schemes are used. In this text, a high-speed mobile terminal is defined as a mobile terminal moving at a speed of 25 m/s or faster.

On the x-axis, N stands for the number of users per coverage area, (base station) while R on the y-axis represents the satisfied-user ratio. One could define the satisfied user-ratio in several different ways. One example of defining R is when the mean received SIR for the user data slots is more than X dB above a SIR target for 95% of TTIs (Transmission Timing intervals). One other way of defining user satisfaction may be the amount of data packets received with a delay less than an upper threshold on the delay in arrival time between two consecutive data packets. Especially in VoIP applications, delay time is a parameter important for measuring user satisfaction. In other applications, other parameters may be of greater importance, such as the throughput.

Returning to FIG. 2, different gating schemes indicated by the reference numbers 230, 240, 250, 260 and 270 are presented in the diagram. The crossed line, indicated as 230 in the legend, depicts the case when the gating scheme "no gating" is used for the power control. During the course of the description "no gating" will be referred to as a gating scheme. In this case, with up to 15 users per coverage area moving at an average speed of 25 m/s using no gating reaches the highest satisfied user ratio R.

The squared line, shown by the reference number 260, represents gating with six preambles. In this case, the DPCCH was chosen to occupy one TTI (Transmission Timing Period). Here we see that gating may not always lead to better performance. For a value of N≦15, it performs worse than when using no gating at all.

The same may be said for the circled 240 and crossed lines 250, representing gating with no preambles and with three preambles, respectively. A similar situation results for the starred line 270 representing gating with six preambles and a gating update for every third TTI (Transmission Timing Period).

Of the gated signaling schemes, the one with no preambles (240) performs the worst in terms of user satisfaction, while gating with six preambles and one gating updated every third TTI performs the best.

It may be mentioned here, that from a certain number N or users per coverage area, gating becomes more efficient than no gating. In this case it was from 16 users per coverage area onward for the gating schemes 250, 260 and 270.

Figure 3:
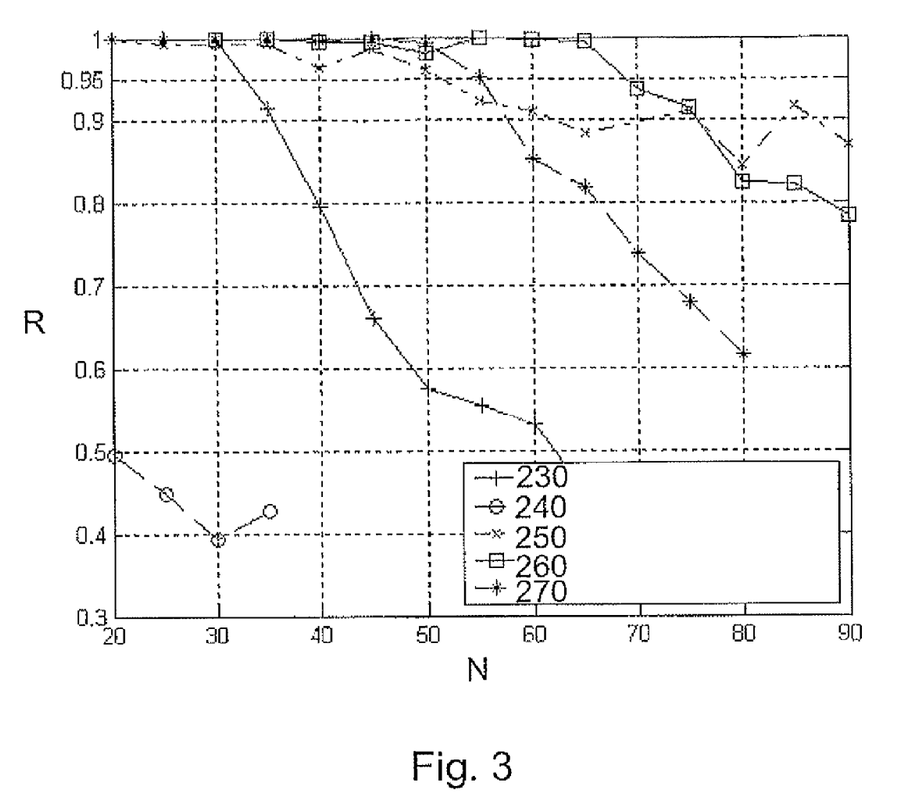
FIG. 3 illustrates the simulated performance of systems using gating schemes and no gating at low mobile terminal speeds.

FIG. 3 illustrates a simulation of the power control signaling with and without gating in a low-speed mobile terminal scenario using the same gating schemes as in FIG. 2. Therefore, the reference numbers for these gating schemes are maintained. Here, the term low-speed refers to speeds up to 1 m/s. It is clear from the simulation that gating with no preambles up to certain number N of users per coverage area leads to very low user satisfaction in this case. Up to 30 users per coverage area, no gating performs as well as other variants of gating with various amount of preambles. From there, i.e. when N>=30 there are big gains to be made in user satisfaction with gating variants using preambles.

The conclusion to be made from the simulation results illustrated in FIGS. 2 and 3 is that there is a trade-off between reduction of signaling overhead due to gating and accurate power control. Thus, the parameters to be taken into consideration before choosing the appropriate gating scheme (and also no gating) may comprise channel quality and average mobile terminal speed. Also, it may be useful to take the number of users per coverage area into account. On the other hand, some wireless communication networks may comprise admission control meaning that the number of users allowed to connect to the base station or access point experiencing a predefined user satisfaction ration will be limited in order not to compromise the satisfaction figure. Other wireless communication networks may allow more users to connect with the result of a lower overall user satisfaction ratio.

Figure 4:
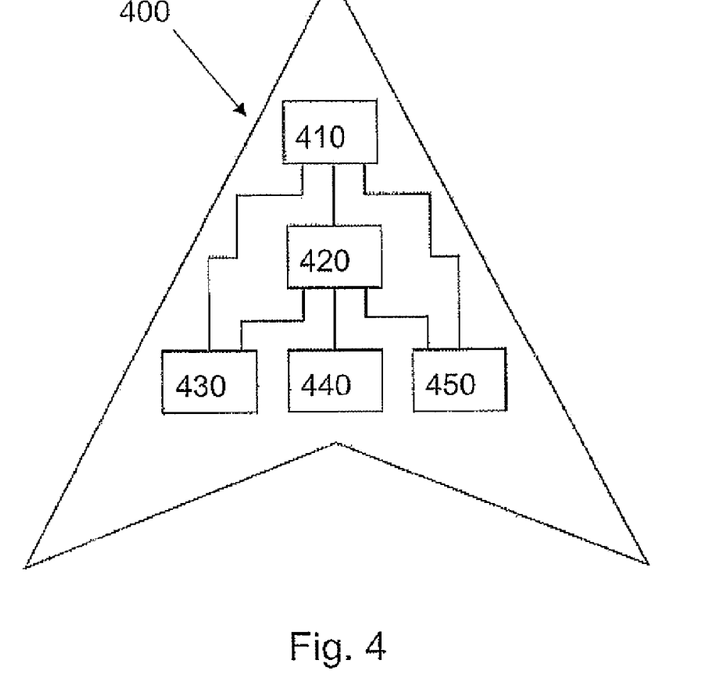
FIG. 4 illustrates a base station according to one embodiment of the present invention.

FIG. 4 illustrates a base station 400 according to one embodiment of the present invention. Here, the term base station comprises BSTs (Base Station Transceivers), Node Bs, APs (Access Points) and other nodes in a wireless communication network perform a function equivalent to a base station. This means also that the present invention is not specifically limited to mobile communication networks, but rather any wireless communication network where gating may be utilized in power control signaling.

The following non-limiting example deals however with the embodiment of a base station 400 according to the present invention in a HSPA scenario.

Examples of such wireless communication networks may comprise IEEE 802.11-series wireless communication networks (a, b, g, n, x and other types), HiperLAN/1 and HiperLAN2, Wimax and other wireless communication networks.

The base station 400 in FIG. 4 comprises a transceiver 410, a processing unit 420, a measurement unit 430, a memory 440 and a control unit 450.

In this embodiment, the measurement unit 430 is adapted to determine the SIR (Signal-to-Interference Ratio) of the incoming data signal and to forward the value to the processing unit 420. However, any other parameter indicative of the signal quality on the radio channel related to the incoming signal may be determined. Examples of such other parameters may be CIR (Channel Interference Ratio), BLER (Block Error Rate), BLEP (Block Error Probability), BER (Bit Error Rate), SNIR (Signal-to-Noise plus Interference Ratio) and other parameters indicative of the transmission condition on the uplink channel.

The function of the processing unit 420 is to calculate a value indicating the amount of deviation from an expected parameter value measured by the measurement unit 430 and to compare the calculated value to a lower and an upper threshold. This value may for example be the variance of the SIR, but may also be any other parameter indicating the deviation from a nominal value related to the signal quality on the uplink.

In one other variant the processing unit 420 may from the received measured parameter value calculate the rate of deviation of the parameter value from a nominal parameter value. In this fashion, rapidly changing conditions on the radio channel may be registered and reacted to even faster. Especially at very high mobile terminal speeds, such as for example, in excess of 25 m/s, signal fading will be fast and the conditions on both the uplink and downlink channels will be changing rapidly. Depending on the wireless communication network, the application used and the number of users participating in the communication with the base station, gating may not be the ideal strategy compared to no gating at all. Alternatively, the base station 400 may, apart from measuring the SIR value for one or more mobile terminals communicating with it, also via the measurement unit 430 determine the speed of the one or more mobile terminals. This may be performed using triangulation over a predefined time period or using GPS or some other navigation system able to determine the speed of movement of the one or more mobile terminals. These navigation systems would presuppose however, that the mobile terminals are equipped with a GPS receiver. Using the information about the variance of the SIR or some other parameter on the uplink plus the speed of movement of the one or more mobile terminals would lead to even more accurate power control and at the same time less signaling overhead between the base station 400 and one or more mobile terminals. One other possible variant of the power control signaling may also involve counting in the measurement unit 430 the number of users in communication with the base station 400. It has been shown in simulations of a 3GPP LTE network that, from a certain number of users onwards, gating may lead to higher user satisfaction even during high-speed movement of the mobile terminals. See FIG. 2 for details.

Now, the threshold values for the variances of the SIR value may be stored in the memory 440. If the SIR variances calculated in the processing unit 420 indicate the variation of the channel quality over a certain predefined time period defined by a measurement window to lie outside of a deviation interval defined by a lower threshold value and an upper threshold value, the processing unit 420 may via the control unit 450 and a control channel transmit information to the mobile terminal ordering it to change the gating scheme. Also, the base station may via the control unit 450 signal the starting and stopping of gating to the mobile terminal.

Alternatively, the base station may by means of the measurement unit 430 measure the SIR or some other parameter indicative of the transmission conditions on the uplink channel and calculate its variance in the processing unit 420, but then signal the parameter variance to the mobile terminal via the transceiver 410. The mobile terminal may then perform the comparison with threshold values and variance decides which gating scheme to use and to change gating schemes.

It may be said that the upper and lower threshold for the SIR variance may differ from gating scheme to gating scheme. For example, the no gating scheme may only have an upper threshold value, while the hardest gating scheme may only have a lower threshold value.

Alternatively, the base station 400 may signal to one or more mobile terminals to change the DPCCH slot format (changing the number of TPC bits per slot) or the power-offset for the E-DPDCH channel. Here, the term power offset refers to the difference in transmit power between the data channel and the associated control channel.

As another option, the base station may measure a parameter (such as the SIR) indicative of the channel condition on the uplink, calculate the variance or some other measure of the rate of change and forward this value to a network element, such as a SRNC (Service Radio Network Controller). Thereafter, the SRNC may inform all base stations involved about the new gating scheme. This would require signaling between the base station and the SRNC.

Especially in handover scenarios, where one or more mobile terminals wander from one coverage area covered by one base station or access point into another coverage area covered by another base station or access point, this option may be beneficial. Thereby, the one or more mobile terminals may keep their gating schemes even after handover.

Figure 5:
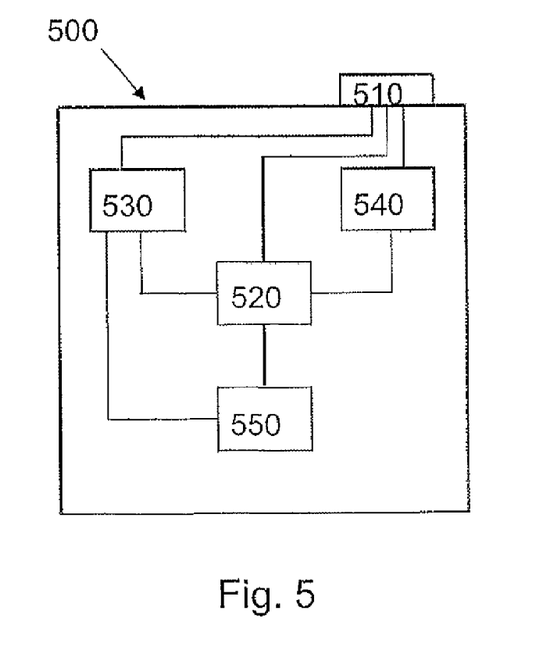
FIG. 5 illustrates a mobile terminal according to one embodiment of the present invention.

Turning now to FIG. 5, a mobile terminal 500 according to one other embodiment of the present invention is shown. It should be understood that the term mobile terminal comprises all kinds of terminals adapted for communication in a wireless communication network, such as, for example, cell phones, smartphones, PDAs, laptops and other terminals suitable for communication in wireless communication networks.

Analogously to the base station 400 from FIG. 4, this example deals with the embodiment of a mobile terminal according to the present invention in a HSPA scenario. However, it should be understood that the mobile terminal according to the present invention may be used in any other wireless communication network where gating is performed, whether it is done on a separate signaling channel or inside data frame.

Now, apart from a transceiver 510, the mobile terminal 500 comprises a measurement unit 530, a control unit 550, a processing unit 520 as well as a memory 540.

The function of the different elements in the mobile terminal 500 is basically identical to those of the base station 400 in FIG. 4. Via the transceiver 510, the mobile terminal 500 may receive control signals related to gating or transmit these control signals by itself to a base station as a reaction to received deviation values from a nominal parameter value indicative of an expected signal quality.

Using the measurement unit 530, the mobile terminal 500 is adapted to measure parameters indicative of the signal quality on the downlink channel. Similar to the base station in FIG. 4, these parameters may comprise SIR (Signal-to-Interference Ratio), CIR (Channel-to-Interference Ratio), SNIR (Signal-to-Noise and Interference Ratio), BLER (Block Error-Rate), BLEP (Block Error Probability) and other parameters.

In this example, the measurement unit 530 is adapted to measure the SIR value for the downlink channel by evaluating it from signals received during a predefined time period and to forward the measured SIR value to the processing unit 520. The processing unit, in turn, is adapted to calculate the variance of the SIR value and thereby determine the amount of deviation for the measured SIR value from a nominal SIR value. This will indicate how channel conditions on the downlink channel are changing.

It may be added, that the processing unit may be adapted to calculate values indicative of the deviation from a nominal parameter value other than the SIR, as preferred.

As already mentioned earlier in the case of the base station in FIG. 4, the processing unit 520 may also be adapted to calculate the rate of deviation for the measured parameter value from a nominal parameter value and thereby even more accurately reflect the speed with which it is moving in relation to a base station. One other possibility would be to let the base station calculate the speed of movement of the mobile terminal 500 and to signal the measured value to the mobile terminal 500.

As already mentioned for the base station in FIG. 4, the mobile terminal 500 may also be adapted to receive measurement values indicative of the channel conditions on the uplink channel from the base station. Then, the mobile terminal 500 would only need to calculate a value indicative of the deviation from a nominal parameter value indicative of the channel conditions on the uplink channel and to assume that the same conditions prevail on the downlink channel.

Analogous to the description for the base station 400 in FIG. 4, the processing unit 520 of the mobile terminal 500 is adapted to compare the calculated SIR variance to an upper and a lower variance threshold stored in the memory 540. In case the calculated SIR variance for a predetermined amount of time defined by the measurement window falls outside the deviation interval defined by these thresholds, processing unit 520 would inform the control unit 550 to change the gating scheme. Thus, the control unit 550 would signal the change in gating scheme by sending a control signal to the base station via the transceiver 510. Also, it may be remarked, that each gating scheme may have its own upper and lower threshold. The "no gating" scheme would only have a lower SIR threshold and the fastest gating scheme only an upper SIR threshold.

The mobile terminal may also, when deciding which gating scheme to use, take its own speed of movement and/or the number of users per coverage area into account, the coverage area referring to the area covered by a base station or an access point. The information about the mobile terminal speed and user count would however have to be provided by the base station or access point covering the area in which the mobile terminal is situated.

Similarly to the situation above for the base station in FIG. 4, the mobile terminal 500 may, as a reaction to the calculated SIR variance for a predetermined amount of time lying outside of the deviation interval defined by the lower and upper threshold gating scheme, increase the power on the control channel where power control commands are transmitted, change the slot format for the DPCCH or adjust the power offset between the data and control channel.

It may be remarked that the signaling described in the case of the base station 400 in FIG. 4 may be reversed, where a mobile terminal, such as the mobile terminal 500 in FIG. 5, may signal the base station 400 to change the gating scheme. Also, all the actions performed by the base station 400 in FIG. 4, apart from the counting of users per coverage area and the detection of the speed of movement, may be equally well performed by the mobile terminal.

Additionally, it may be said that the operations performed by the mobile terminal 500 or the base station 400 may be performed by some other network element, such as the earlier mentioned SRNC. The only part where signaling to another unit would be needed, would then be the change of a gating scheme and the starting and stopping of a gating scheme.

Figure 6:
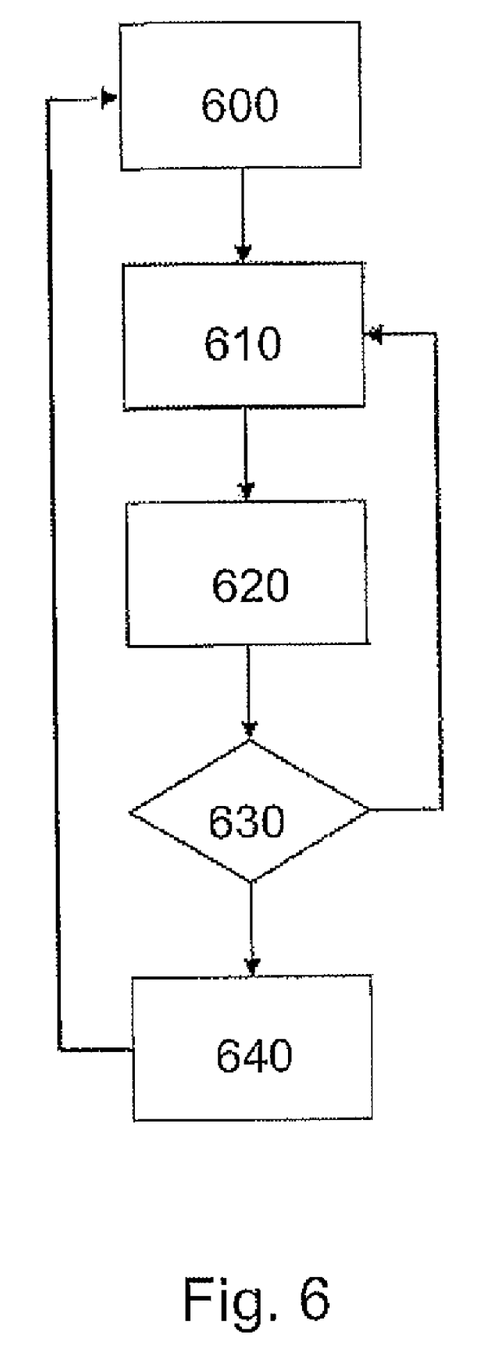
FIG. 6 illustrates the steps of a method according to one embodiment of the present invention.

Turning now to FIG. 6, a flow chart illustrating the steps of a method according to the present invention are shown. The steps described below are presented from the perspective of a mobile terminal, but they would be analogous in the case a base station is performing the steps.

Now, at step 600, a mobile terminal, such as the mobile terminal 500 illustrated in FIG. 5, sets an initial gating scheme, an initial measurement period for measuring a parameter value indicative of the transmission conditions on the radio channel and a measurement window.

Usually, the a control unit, such as the control unit 550 in FIG. 5 in the mobile terminal, may set a default gating scheme, such as gating with a preamble of a predefined length.

The control unit may also initially set a measurement period of, say 5 seconds, meaning that measurements of a parameter value indicative of the transmission conditions on the radio channel will be effectuated every fifth second. This measurement period may be chosen to be shorter or longer, as desired.

Additionally, the window size set in step 600 is also set by the control unit of the mobile terminal, Where the window size may be defined as the length of a time interval during which measurements of parameter values indicative of channel conditions are performed. Suitable window sizes may range from a couple of second to tenths of seconds, again, as desired.

Next, at step 610 the processing unit receives a measured parameter value, where the parameter is indicative of the transmission conditions on a channel on which the mobile terminal is transmitting user data. In this example method the parameter value is chosen to be the SIR (Signal-to-Interference Ratio), but the parameter may also comprise other values, such as the BLER, BLEP, CIR, SNIR and other values mentioned earlier in the description.

The measured parameter value may be received from the mobile terminal's own measurement unit, such as the measurement unit 530 in FIG. 5, or from some other source, such as a base station in whose coverage area the mobile terminal is currently located.

At step 620, a processing unit in the mobile terminal, such as the processing unit 520, calculates from the received measured parameter values a numerical parameter value indicative of the deviation from a nominal parameter value and compares the calculated value with either one lower threshold, one upper threshold or with and upper and a lower threshold for a parameter value indicative of the amount of deviation of the calculated parameter value from a nominal parameter value. One possibility is to choose a threshold SIR variance as that parameter value. Other possible parameter values may comprise deviations from a nominal CIR, SNIR, BLER, BLEP or other parameter values as well as the deviation of mobile terminal's speed of movement from a nominal speed value.

It may be noted, that for some schemes, where for example no gating is used and for the hardest gating there only exists a lower or an upper parameter value threshold.

From the initial step 600, the processing unit which is performing the comparison between the calculated deviation from the parameter value and the threshold deviation from the parameter values, will know if there is only one lower, one upper or both a lower and an upper threshold for the deviation from the parameter value to compare with.

Now, if at step 630 the processing unit has determined that the calculated deviation from the parameter value, such as, for example, the SIR variance has been lying outside of the interval defined by a lower SIR variance and an upper SIR variance threshold, or by a lower SIR variance threshold or by an upper SIR variance threshold (depending on which gating scheme is the current gating scheme) for the amount of time defined by the measurement window size, the processing unit orders at step 640 the control unit in the mobile terminal to change the gating scheme and to signal the gating scheme to a base station.

Alternatively, instead of changing the gating scheme, the control unit of the mobile terminal may instruct a change of the slot format for the DPCCH, increasing or decreasing the number of TPC bits in each DPCCH. As another alternative, the processing unit may instruct the control unit to increase the power on the uplink control channel thereby changing the power offset between the data and control channels.

The reception of measured parameter values continues then at step 610 again and the method steps are again repeated.

Now, if on the other hand, it is determined by the processing unit of the mobile terminal at step 630 that the calculated deviation from a nominal parameter value does not lie outside the interval defined by the lower and upper threshold values, the lower threshold value or the upper threshold value, then the mobile terminal returns to step 610, where it receives new measured parameter values.

It should be mentioned that the method steps described in FIG. 6 may be executed by a computer program stored in the memory of the base station 400 and/or the mobile terminal 500. Also, the computer program may be stored on an ASIC (Application Specific integrated Circuit) or on a storage medium, such as a FLASH-ROM, hard disk, CD or DVD-type media or other removable storage media.

Finally, it may be understood by the skilled person after having read the previous description, that many other embodiments of the present invention are possible and that the scope of the invention is only limited by the accompanying patent claims.

The invention claimed is:

1. A network element for communication in a wireless High Speed Packet Access (HSPA) communication network, the network element comprising:
    a transceiver;
    a processing unit to:
        receive at least one measured parameter value indicative of a channel quality on an uplink radio channel, and
        calculate a deviation of the measured parameter value from a nominal parameter value indicative of an expected quality on the uplink radio channel; and
    a control unit to change a gating scheme of a control channel of the uplink radio channel,
    the processing unit is further to:
        compare the calculated deviation of the measured parameter value with a lower threshold value indicative of the lower threshold of deviation from a nominal parameter value and/or an upper threshold of deviation from a nominal parameter value,
        instruct the control unit to change the gating scheme of the control channel of the uplink radio channel, if the calculated deviation from a nominal parameter value lies outside of the deviation interval defined by at least the lower threshold value, and
        signal the change of the gating scheme of the control channel,
    where the calculated deviation from a nominal parameter value comprises one of variance, standard deviation, or other types of deviation of a stochastic variable.

2. The network element according to claim 1, where the network element further comprises:
    a memory to store the calculated deviation of the measured parameter value from a nominal parameter value, and
    store at least the lower threshold value indicative of the lower threshold value for the deviation from the nominal parameter value.

3. The network element according to claim 1, where each gating scheme comprises one or more threshold values, for the deviation from the nominal parameter value, that are different from other gating schemes.

4. The network element according to claim 1, where a "no gating" scheme comprises a lower threshold for the deviation from the nominal parameter value.

5. The network element according to claim 1, where the received measured parameter value comprises one of a Signal-to-Interference Ratio (SIR), a Carrier-to-Interference Ratio (CIR), a Signal-to-Noise-and-Interference Ratio (SNIR), a Channel Quality Indicator (CQI), a Block Error-Rate (BLER), a Block Error Probability (BLEP), or one or more other parameter values indicative of the quality on the radio channel.

6. The network element according to claim 1, where the network element comprises a Service Radio Network Controller (SRNC).

7. The network element according to claim 1, where the network element further comprises:
a measurement unit to:
measure the parameter value indicative of the channel quality on the radio channel, and
forward the measured parameter value to the processing unit of the network element.

8. The network element according to claim 1, where the network element comprises a base station.

9. A method of communication in a wireless High Speed Packet Access (HSPA) communication network, the method comprising:
receiving at least one measured parameter value indicative of a channel quality on a radio channel;
calculating a deviation from a nominal parameter value indicative of an expected quality of the radio channel;
comparing the deviation from the nominal parameter value with at least a lower threshold value indicative of a lower threshold for the deviation from the nominal parameter value and/or an upper threshold value indicative of an upper threshold of deviation from the nominal parameter value;
changing a gating scheme of a control channel, if the calculated deviation from a nominal parameter value lies outside of a deviation interval defined by at least the lower threshold value; and
signalling the change of the gating scheme of the control channel, where the calculated deviation from a nominal parameter value comprises one of variance, standard deviation, or other types of deviation of a stochastic variable.

10. A non-transitory computer readable medium embodied with a computer program product having computer executable instructions for communication in a wireless High Speed Packet Access (HSPA) communication network, the computer program product comprising:
one or more instructions to receive at least one measured parameter value indicative of a channel quality on a radio channel;
one or more instructions to calculate a deviation from a nominal parameter value indicative of an expected quality of the radio channel;
one or more instructions to compare the deviation from the nominal parameter value with at least a lower threshold value indicative of a lower threshold for the deviation from the nominal parameter value and/or an upper threshold value indicative of an upper threshold of deviation from the nominal parameter value;
one or more instructions to change a gating scheme of a control channel, if the calculated deviation from a nominal parameter value lies outside of a deviation interval defined by at least the lower threshold value; and
one or more instructions to signal the change of the gating scheme of the control channel, where the calculated deviation from a nominal parameter value comprises one of variance, standard deviation, or other types of deviation of a stochastic variable.

11. The method of claim 9, where each gating scheme comprises one or more threshold values, for the deviation from the nominal parameter value, that are different from other gating schemes.

12. The method of claim 9, where a "no gating" scheme comprises a lower threshold for the deviation from the nominal parameter value.

13. The method of claim 9, where the received measured parameter value comprises one of a Signal-to-Interference Ratio (SIR), a Carrier-to-Interference Ratio (CIR), a Signal-to-Noise-and-Interference Ratio (SNIR), a Channel Quality Indicator (CQI), a Block Error-Rate (BLER), a Block Error Probability (BLEP), or one or more other parameter values indicative of the quality on the radio channel.

14. The non-transitory computer readable medium of claim 10, where each gating scheme comprises one or more threshold values, for the deviation from the nominal parameter value, that are different from other gating schemes.

15. The non-transitory computer readable medium of claim 10, where a "no gating" scheme comprises a lower threshold for the deviation from the nominal parameter value.

16. The non-transitory computer readable medium of claim 10, where the received measured parameter value comprises one of a Signal-to-Interference Ratio (SIR), a Carrier-to-Interference Ratio (CIR), a Signal-to-Noise-and-Interference Ratio (SNIR), a Channel Quality Indicator (CQI), a Block Error-Rate (BLER), a Block Error Probability (BLEP), or one or more other parameter values indicative of the quality on the radio channel.

* * * * *